(12) United States Patent
Liu et al.

(10) Patent No.: US 10,916,816 B2
(45) Date of Patent: Feb. 9, 2021

(54) INTERNAL BATTERY THERMAL MANAGEMENT SYSTEM FOR SECONDARY BATTERIES

(71) Applicant: Jie Liu, Ottawa (CA)

(72) Inventors: Jie Liu, Ottawa (CA); Rui Zhao, Ottawa (CA)

(73) Assignee: Jie Liu, Ottawa (CA)

( * ) Notice: Subject to any disclaimer, the term of this patent is extended or adjusted under 35 U.S.C. 154(b) by 191 days.

(21) Appl. No.: 16/058,209

(22) Filed: Aug. 8, 2018

(65) Prior Publication Data

US 2019/0252743 A1 Aug. 15, 2019

(30) Foreign Application Priority Data

Feb. 9, 2018 (CN) .......................... 2018 1 0133183

(51) Int. Cl.
*H01M 10/637* (2014.01)
*H01M 10/0525* (2010.01)
*H01M 10/615* (2014.01)
*H01M 10/42* (2006.01)
*H01M 10/48* (2006.01)
*H01M 10/6571* (2014.01)
*H01M 10/654* (2014.01)
*H01M 10/6551* (2014.01)
*H01M 10/659* (2014.01)
*H01M 2/10* (2006.01)
(Continued)

(52) U.S. Cl.
CPC ....... *H01M 10/637* (2015.04); *H01M 2/1016* (2013.01); *H01M 10/0525* (2013.01); *H01M 10/0585* (2013.01); *H01M 10/0587* (2013.01); *H01M 10/425* (2013.01); *H01M 10/486* (2013.01); *H01M 10/615* (2015.04); *H01M 10/654* (2015.04); *H01M 10/659* (2015.04); *H01M 10/6551* (2015.04); *H01M 10/6571* (2015.04); *H01M 2010/4278* (2013.01)

(58) Field of Classification Search
CPC .... H01M 10/63; H01M 10/637; H01M 10/42; H01M 10/486; H01M 2/1016
See application file for complete search history.

(56) References Cited

U.S. PATENT DOCUMENTS

2012/0003523 A1\* 1/2012 Schaller ............ H01M 10/6557
429/120
2016/0226042 A1\* 8/2016 Hartmann ........... H01M 2/0295
2016/0226114 A1\* 8/2016 Hartmann .............. C08G 18/48
(Continued)

*Primary Examiner* — Amanda C. Walke
(74) *Attorney, Agent, or Firm* — Rosenberg, Klein & Lee (57) ABSTRACT

A low temperature (e.g., lower than 0° C.) or a high temperature (e.g., higher than 50° C.) can degrade battery performance, especially within lithium ion (Li-ion) batteries, and even accelerate the capacity fading. To ensure a long term and safe operation of Li-ion batteries, the battery thermal management (BTM) system becomes a crucial part to control the temperature of each discrete battery or every battery within a battery pack. Within the prior art a phase change material (PCM) has been employed combined with a graphite matrix. However, the graphite lowers the latent heat of entire BTM system and increases the manufacturing cost. Embodiments of the invention provide sealed mandrels or elements which immobilize the PCM without impacting the latent heat of the entire BTM system and increasing manufacturing costs.

5 Claims, 7 Drawing Sheets

(51) Int. Cl.
*H01M 10/0585* (2010.01)
*H01M 10/0587* (2010.01)

(56) References Cited

U.S. PATENT DOCUMENTS

| | | | | |
|---|---|---|---|---|
| 2017/0149103 A1* | 5/2017 | Yang | .................... | H01M 10/613 |
| 2018/0017339 A1* | 1/2018 | Bry | ....................... | F28F 9/0135 |
| 2019/0312251 A1* | 10/2019 | Matthews | ............... | H01M 2/26 |
| 2019/0375939 A1* | 12/2019 | Wei | .......................... | C08K 5/02 |
| 2019/0393576 A1* | 12/2019 | Sunada | ............. | H01M 10/6569 |
| 2020/0136209 A1* | 4/2020 | Dede | ....................... | B60L 58/26 |
| 2020/0136216 A1* | 4/2020 | Dede | ....................... | B60L 58/26 |

\* cited by examiner

INTERNAL BATTERY THERMAL MANAGEMENT SYSTEM FOR SECONDARY BATTERIES

FIELD OF THE INVENTION

This patent application relates to batteries and more particularly to methods and systems for battery thermal management field, and more specifically, phase change material based internal thermal management system for secondary batteries.

BACKGROUND OF THE INVENTION

Secondary batteries, especially lithium-ion (Li-ion) batteries, are extensively used in daily life. Due to their high energy density, specific energy, and low capacity fading rate, Li-ion batteries have become an indispensable component for the electric vehicle (EV) and hybrid electric vehicle (HEV) market. They are also used in a wide range of portable electronic devices such as cellphones, power banks, laptops, digital cameras, gaming consoles, etc. as well as a wide range of fixed electronic devices as a backup to the primary wired power supply (commonly referred to as mains) when this fails. There are a variety of types of secondary batteries, including lithium-ion (Li-ion) batteries (such as $LiFePO_4$ battery, $LiCoO_2$ battery, $LiNiCoAlO_2$ battery, etc.), nickel-metal hydride battery, nickel cadmium battery, etc.

Among the secondary batteries, Li-ion batteries have been extensively researched and used due to their higher energy density and specific energy. Li-ion batteries will be an indispensable part for the development of electric vehicles. However, the temperature sensitivity of Li-ion batteries makes them work well only in a certain temperature range. A low temperature (e.g., lower than 0° C.) or a high temperature (e.g., higher than 50° C.) can degrade the battery performance, and even accelerate the capacity fading. To ensure a long term and safe operation of Li-ion batteries, the battery thermal management (BTM) system becomes a crucial part to control the temperature of every single battery at low level and to manage the maximum temperature difference within 5° C.

Generally, BTM systems can be divided into two groups, namely active BTM systems and passive BTM systems. An active BTM system dissipates the heat generated from batteries by circulating the cooling air or coolant, and it generally needs a power-consuming device, such as a pump or a cooling fan, to circulate the cooling medium. Active BTM system is efficient in managing the battery temperature, but it consumes part of the battery energy, and it adds complexities to the system. In contrast, passive BTM systems absorb the heat generated from batteries by filling cooling materials with high specific heat in between batteries.

Amongst the central topics of BTM research work is on the either the exploitation of phase change materials (PCMs) in so-called PCM BTM systems or water/glycol based BTM systems. Amongst the drawbacks of passive BTM systems is that the addition of the cooling material increases the weight of the battery system and reduces the volume of active charge storing material, thus reducing the specific energy of the battery system. Accordingly, there is a drive to use the minimum amount of cooling material to achieve the best cooling effect and minimal reduction in the secondary battery's specific energy.

Among these two passive BTM systems, PCM methodologies have a higher latent heat and overall specific heat, and have been extensively studied in recent years. Initially, designs for PCM based BTMs used the PCM to directly surround batteries in BTM systems. However, within the prior art it has been identified that the low thermal conductivity of the PCM or PCMs employed can substantially constrain its actual cooling potential. In addition, PCMs are liquid materials which adds extra complexity to the BTM system. Accordingly, within the prior art expanded graphite (EG) has been employed as a matrix to absorb the PCM and increase the thermal conductivity of entire cooling system. Beneficially, the EG-PCM composite by appropriate design allows for the liquid-state PCM to be substantially immobilized inside the EG matrix through the strong capillary force generated by the EG matrix, thereby avoiding leakage issues of the PCM. However, within the prior art a requirement for a minimum 30 wt. % EG content has been established in order to reduce PCM leakage to the desired low levels for long term storage and use of the secondary batteries. This minimum 30 wt. % EG thereby lowers the latent heat of entire BTM system as well as increasing the manufacturing cost.

Accordingly, it would be beneficial to provide designers of secondary batteries with a means of immobilizing the PCM without impacting the latent heat of the entire BTM system and increasing manufacturing costs.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to batteries and more particularly to methods and systems for battery thermal management field, and more specifically, phase change material based internal thermal management system for secondary batteries.

In accordance with an embodiment of the invention there is provided a battery comprising:

a sealed element filled with at least one phase change material of a plurality of phase change materials, wherein the sealed element is disposed in predetermined relationship to an anode structure, a cathode structure and an electrolyte which also form part of the battery.

In accordance with an embodiment of the invention there is provided a battery pack comprising:

an outer shell; and a plurality of batteries disposed within the outer shell, each battery comprising a sealed element filled with at least one phase change material of a plurality of phase change materials, wherein the sealed element is disposed in predetermined relationship to an anode structure, a cathode structure and an electrolyte which also form part of the battery.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present description is directed to batteries and more particularly to methods and systems for battery thermal management field, and more specifically, phase change material based internal thermal management system for secondary batteries.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "rechargeable battery" also known as a storage battery, secondary cell, or accumulator is a type of electrical battery which can be charged, discharged into a load, and recharged many times, as opposed to a disposable or primary battery, which is supplied fully charged and discarded after use. It is composed of one or more electrochemical cells. The term "accumulator" is used as it accumulates and stores energy through a reversible electrochemical reaction. Rechargeable batteries are produced in many different shapes and sizes, ranging from button cells to megawatt systems connected to stabilize an electrical distribution network. Several different combinations of electrode materials and electrolytes are used, including lead-acid, nickel-cadmium (NiCd), nickel-metal hydride (NiMH), lithium-ion (Li-ion), aluminum ion (Al-ion), and lithium-ion polymer (Li-ion polymer).

A "lithium-ion battery" or "Li-ion" battery (often abbreviated to LIB) as used herein and throughout this disclosure, refers to a type of rechargeable battery in which lithium ions move from the negative electrode to the positive electrode during discharge and back when charging. Li-ion batteries use an intercalated lithium compound as one electrode material, compared to the metallic lithium used in a non-rechargeable lithium battery. The electrolyte, which allows for ionic movement, and the two electrodes are the constituent components of a lithium-ion battery cell. Chemistry, performance, cost and safety characteristics vary across LIB types. Handheld electronics mostly use LIBs based on lithium cobalt oxide ($LiCoO_2$), which offers high energy density, but presents safety risks, especially when damaged. Lithium iron phosphate ($LiFePO_4$), lithium ion manganese oxide battery ($LiMn_2O_4$, $Li_2MnO_3$, or LMO) and lithium nickel manganese cobalt oxide ($LiNiMnCoO_2$ or NMC) offer lower energy density, but longer lives and less likelihood of unfortunate events in real world use, (e.g., fire or explosion). Such batteries are widely used for electric tools, medical equipment, and other roles. NMC in particular is a leading contender for automotive applications whilst lithium nickel cobalt aluminum oxide ($LiNiCoAlO_2$ or NCA) and lithium titanate ($Li_4Ti_5O_{12}$ or LTO) are typically considered specialty designs aimed at particular niche roles. Newer lithium-sulfur battery designs offer promise of higher performance-to-weight ratio albeit with lower voltage at 2.0V. Most rechargeable cylindrical cells use a chemistry with a nominal voltage around 3.7 volts, but $LiFePO_4$ cells produce only 3.2 volts.

An "18650" or "18650 type" battery as used herein and throughout this disclosure, refers to a cylindrical Li-ion battery providing a typical capacity between 1500-3600 mAh and having dimensions of maximum diameter 18.6 mm (0.75 inches) and length 65.2 mm (2.6 inches). Such 18650 type Li-ion batteries being used in many laptop computer batteries, LED flashlights, electronic cigarettes, cordless power tools and Tesla EVs such as the Tesla Roadster, Tesla Model S, and Tesla Model X. 18650 type batteries may also be referred to as 168 A type batteries. A 18650 battery represents one cylindrical battery of a multiple standard and non-standard cylindrical batteries employed discretely or within battery packs. A more complete, but non-exhaustive list, of cylindrical battery geometries as well as others may be found in a variety of locations including, for example, Wikipedia at https://en.wikipedia.org/wiki/List_of_battery_sizes. However, embodiments of the invention may be exploited within non-cylindrical battery geometries.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that typically exploits connection to a fixed interface to obtain power but may include a battery backup or uninterruptable power supply to provide ongoing operation of the fixed electronic device for a predetermined period of time. This includes, but is not limited to, a laptop computer, a personal computer, a computer server, a kiosk, a gaming console, a digital set-top box, an analog set-top box, an Internet enabled appliance, an Internet enabled television, and a multimedia player.

A "phase change material" (PCM) as used herein and throughout this disclosure, refers to a substance with a high heat of fusion which, by melting and solidifying at a certain temperature, is capable of storing and releasing large amounts of energy. Heat is absorbed or released when the material changes from solid to liquid and vice versa. Accordingly, PCMs are classified as latent heat storage (LHS) units. Examples of PCMs are those that achieve latent heat storage through liquid→solid, solid→liquid, solid→gas and liquid→gas phase changes. However, typically only solid→liquid and liquid→solid phase changes are considered practical for PCMs. Although liquid-gas transitions have a higher heat of transformation than solid-liquid transitions, liquid→gas phase changes are generally impractical for thermal storage due to the large volumes or high pressures required to store the materials in their gas phase. Similarly, solid-solid phase changes are generally not employed due to their typically very slow and have a relatively low heat of transformation. Examples of PCMs include organic PCMs, such as paraffins ($C_nH_{2n+2}$) or those that are carbohydrate and lipid derived; inorganics, such as salt hydrates ($M_nH_2O$); inorganic eutectics, such as c-inorganic and inorganic-inorganic compounds; hygroscopic materials, and solid-solid PCM materials. PCMs may be selected based upon a variety of factors including the transition temperature at which they melt/solidify. For transition temperatures between 0° C. and 100° C. PCMs may include, but are not limited to, sodium sulphate ($Na_2SO_4$), sodium chloride-sodium sulphate ($NaCl$—$Na_2SO_4$), manganese nitrate (Mn $(NO_3)_2$), manganese chloride ($MnCl_2$), sodium silicate ($Na_2SiO_3$), Paraffin X-Carbons where X is an integer and $14 \le X \le 34$, caprillic acid, glycerin, 1-lattic acid, methyl palmitate, camphenilone, docasyl bromide, caprylone, phenol, heptadecanone, 1-Cyclohexylooctadecane, 4-Heptadacanone, p-Joluidine, cyanamide, methyl eicosanate, 3-Heptadecanone, 2-Heptadecanone, hydrocinnamic acid, cetyl acid, a-Nepthylamine, camphene, O-Nitroaniline, 9-Heptadecanone, thymol, methyl behenate, diphenyl amine, p-Dichlorobenzene, oxolate, hypophosphoric acid, O-Xylene dichloride, ß-Chloroacetic acid, chloroacetic acid, nitro naphthalene, trimyristin, heptaudecanoic acid, a-Chloroacetic acid, bees wax, glyolic acid, glycolic acid, p-Bromophenol, azobenzene, acrylic acid, dinto toluent, phenylacetic acid, thiosinamine, bromcamphor, durene, methly brombenzoate, alpha napthol, glautric acid, acetic acid, polyethylene glycol 600, capric acid, eladic acid, pentadecanoic acid, tristearin, myristic acid, palmatic acid, stearic acid, acetamide, and methyl fumarate.

A "mandrel" as used herein and throughout this disclosure, refers to an object against which or around material one or more other materials can be shaped, wrapped, or disposed. Whilst a mandrel may be circular in cross-section other geometries may be employed comprising, for example, a regular polygon, an irregular polygon, an ellipse, a regular non-polygonal profile, or an arbitrary irregular non-polygonal profile. Within the descriptions below in respect of embodiments of the invention the sealed component of batteries and battery packs according to embodiments of the invention may be referred to as a mandrel or an element. Other components of the battery such as anode and cathode may be around the mandrel or element with the electrolyte filling the regions around the mandrel or element and outer case for example. These may be assembled using the mandrel or element as a former or support or they may not use the mandrel or element as a former or support.

Embodiments of the invention relate to providing cost-effective, high energy density, and compact phase change material (PCM) based internal battery thermal management (BTM) systems for battery temperature control. Embodiments of the invention allow the cooling potential of the PCM to be exploited to the fullest extent. Embodiments of the invention beneficially provide the enhanced BTM system in a lightweight format and provide improved temperature uniformity of batteries exploiting the embodiments of the invention within the battery cell.

Within the descriptions below in respect of FIGS. 1 to 8 elements are identified with common reference identifiers between each Figure for the same element. These being:

1 Li-ion battery 1;
11 Li-ion battery case 11;
12 Li-ion electrochemical reaction cell 12;
2 Sealed mandrel;
21 Groove 21;
3 Phase change material (PCM);
4 Mandrel; and
5 Air.

Embodiments of the invention may be implemented by embedding the phase change material (PCM) based internal battery thermal management (BTM) system within the core of a cylindrical rechargeable battery cell, the BTM system thereby alleviate the heat concentration within the battery cell and improve the temperature uniformity within the battery cell. When compared to the PCM based external BTM (PCM-Ext-BTM) system of the prior art, the cooling mandrel within embodiments of the invention has a shorter heat transfer length, thereby the low thermal conductivity of the PCM will not affect the full cooling capacity of the PCM, which thereby allows for the elimination of the expensive expanded graphite matrix. Therefore, the PCM based internal BTM (PCM-Int-BTM) system can maximize the overall specific heat of the PCM, can eliminate the use of thermally conductive matrix, and can lower the weight of the entire battery system. In terms of the assembly and maintenance, the PCM filled mandrel can be placed in the battery core during the battery manufacturing stage. Compared to the PCM based external BTM system, the sealing procedure for each single mandrel will be simpler, and the maintenance cost will be lower.

A: Phase Change Material Based Internal Battery Thermal Management Concept

Figure 1:
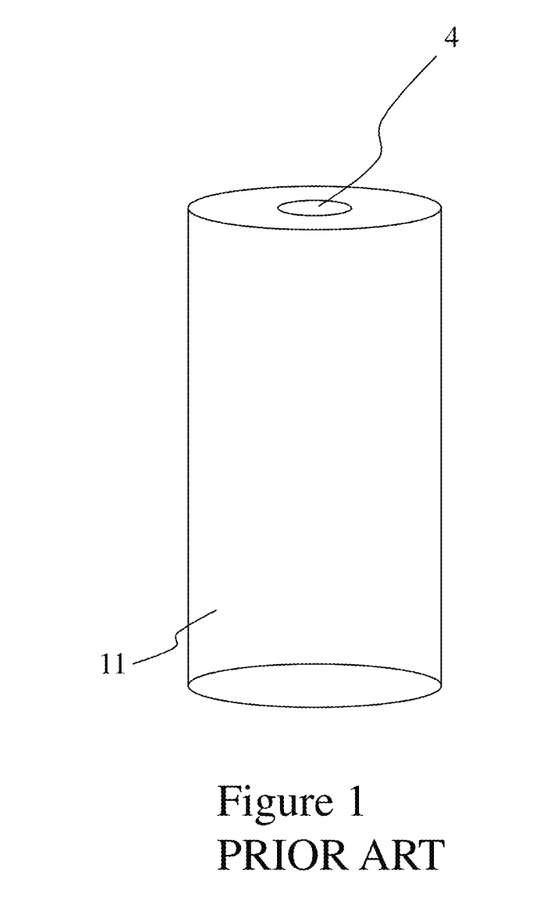
FIG. 1 is a schematic illustration of the structure of a typical cylindrical Li-ion battery according to the prior art.

Referring to FIG. 1 there is depicted a cylindrical secondary battery 1 according to the prior art comprising an outer Li-ion battery case (battery case) 11 defining a volume around a mandrel 4. Disposed within the volume of the battery case 11 around the mandrel but not shown for clarity are the negative electrode (e.g. carbon), positive electrode (e.g. a metal oxide) and the electrolyte (e.g. a lithium salt in an organic solvent). Typically, the negative electrode and positive electrode are in sheet form with a separator sheet between them and formed in a continuous spiral within the inner volume or as a series of wrapped sheets (these sheets being laid on other geometries within secondary batteries of other geometries or composed of a number of circular cells within an outer body).

Figure 2:
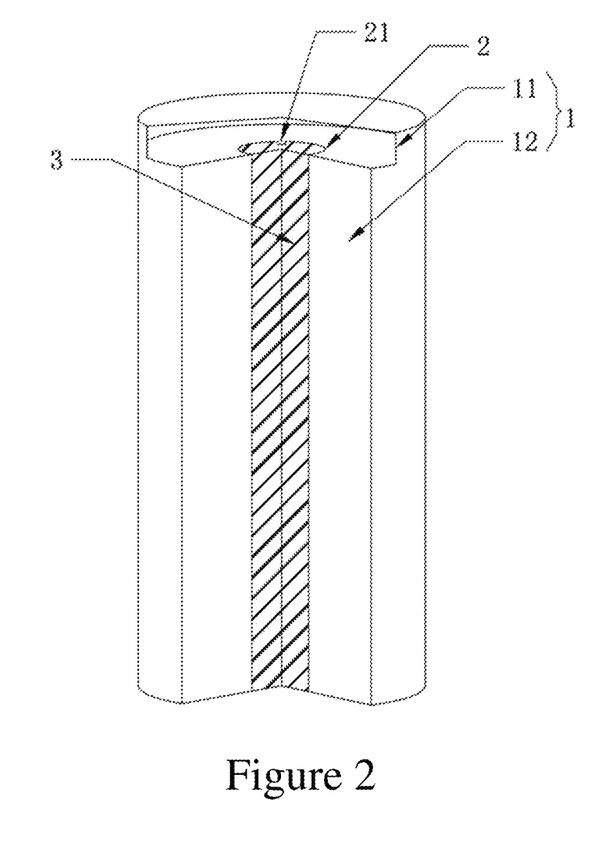
FIG. 2 depicts schematically a three-dimensional (3D) perspective cross-section of a cylindrical Li-ion battery exploiting a PCM based internal BTM system according to an embodiment of the invention.
Figure 3:
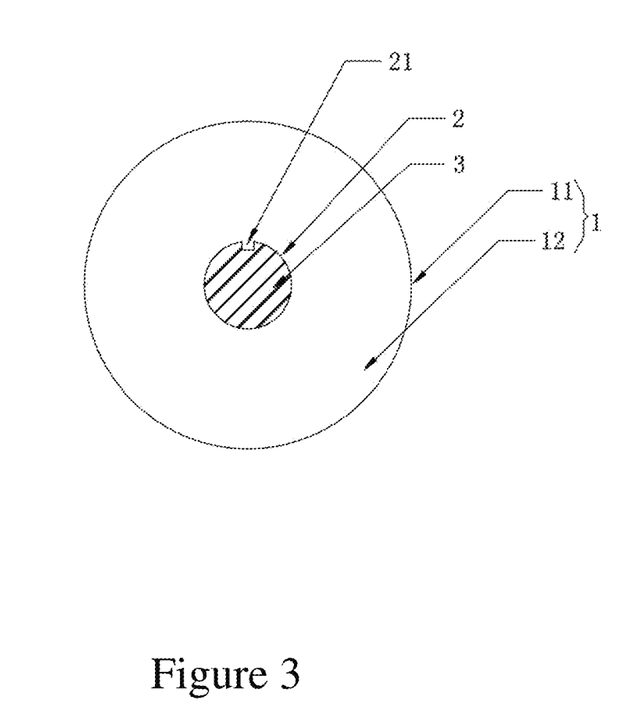
FIG. 3 depicts a cross-sectional view of the cylindrical Li-ion battery exploiting a PCM based internal BTM system according to an embodiment of the invention depicted in FIG. 2.
Figure 4:
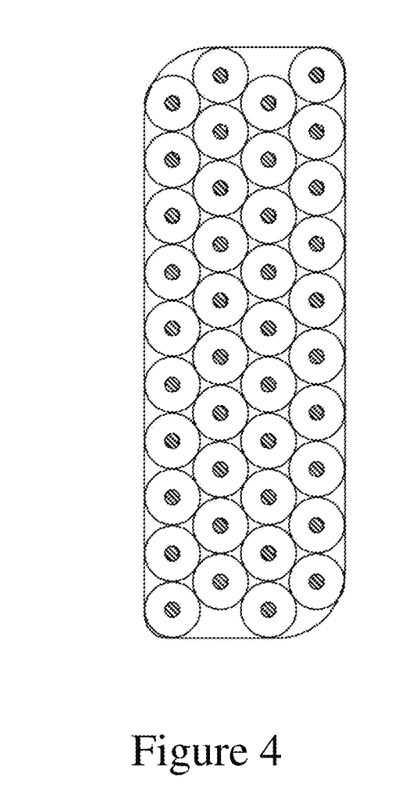
FIG. 4 depicts a schematic of a 40-cell battery pack with multiple cylindrical Li-ion battery cells exploiting PCM based internal BTM systems according to an embodiment of the invention.

However, referring to FIGS. 2 and 3 there are depicted schematically a three-dimensional (3D) perspective cross-section view and cross-sectional view respectively of a cylindrical Li-ion battery exploiting a PCM based internal BTM system according to an embodiment of the invention. Accordingly, as depicted the PCM based internal BTM system includes a cylindrical sealed mandrel 2 embedded in the Li-ion battery 1, where the phase change material (PCM) 3 is used as the filler for within the sealed mandrel 2. The sealed mandrel 2 used accordingly within embodiments of the invention exploits a high thermal conductivity material, such as a metal, alloy, etc. Examples of high conductivity metals include silver, copper, gold, aluminium, tungsten, nickel, zinc, iron, platinum and titanium. Examples of alloys include brass, bronze, phosphorbronze, aluminum bronze, carbon steel, and stainless steel. Which metal(s) and/or alloy(s) are employed is a tradeoff between the desired thermal conductivity, cost, mechanical properties of the metal(s) and/or alloy(s) for forming desired structures, and chemical properties relative to the PCM material, electrolyte etc. During manufacturing the sealed mandrel 2 is filled with the PCM 3 before sealing. The sealed mandrel 2 then be used in the same manner as mandrel 4 as a winding mandrel during the battery assembly stage with the sheets of negative electrode, separator, and positive electrode before the electrolyte is added and the battery sealed etc. Accordingly, a Li-ion battery 1 according to an embodiment of the invention comprises the case 11, electrochemical reaction cell 12, and the sealed mandrel 2 which provides the PCM based internal BTM system which is placed in the center of the electrochemical reaction cell 12.

As shown in FIGS. 1 and 2, the design methodology for the PCM based internal BTM system according to embodiments of the invention is that the sealed mandrel providing the PCM based internal BTM system replaces the conventional mandrel 4 allowing the overall manufacturing sequence of the Li-ion battery 1 and the exterior appearance of Li-ion battery embedded with the PCM based internal BTM system to be the same as an ordinary Li-ion battery cell. Accordingly, the PCM based internal BTM system according to embodiments of the invention alleviates the heat concentration at battery cell core and facilitates the assembly of the battery cells into battery packs without requiring designs and methodologies requiring external cooling channels. Accordingly, the PCM based internal BTM system according to embodiments of the invention makes the battery cooling system simpler and more effective. Also, this PCM based internal BTM system allows secondary battery cells to be designed with a range of different geometries including that of the traditional 18650 cells but also designs that are larger diameter and a longer when compared to the traditional 18650 cells such as 21700, 25500, 32600, and 32650 cells for example.

Within a prior art Li-ion battery, the electrochemical reaction cell 12 is wound on the mandrel 4, which is used for electrolyte injection and gas venting. Within FIGS. 2 and 3 in order to achieve the internal cooling effect and enable the electrolyte injection and gas venting a groove structure 21 is designed into the external wall of the sealed mandrel. The number of grooves employed may vary within different designs of cells but may for example be 1, 2, 4, 8, 10 or more. The PCM based internal BTM system manages the heat generated from the Li-ion cell by utilizing the solid-liquid phase change, which is of high latent heat and is effective in lowering the battery temperature.

Within embodiments of the invention the groove or slot as it may also be referred to as may have a predetermined cross-section which is similar or different to that of the mandrel upon the outer surface of which it is formed. Within embodiments of the invention the groove may be uniform along the length of the mandrel or it may taper, for example from a first dimensioned groove at one predetermined point on the mandrel tapering to a different dimensioned groove at another predetermined point on the mandrel. Optionally, the groove may taper in a predetermined manner along the surface of the mandrel. Optionally, the groove(s) may be axial to a long axis of the mandrel and/or battery or they may be around the periphery of the mandrel perpendicular to a long axis of the mandrel. Optionally, multiple grooves in one direction on the outer surface of the mandrel may be linked with other grooves in another direction on the outer surface of the mandrel. Optionally, the groove(s) may spiral around the surface.

Within embodiments of the invention a groove or grooves may be oriented upon the mandrel in dependence upon an axis of the mandrel. Within embodiments of the invention a groove or grooves may be oriented upon the mandrel in dependence upon an axis of the battery within which the mandrel is disposed.

For Li-ion batteries without the PCM based internal BTM system according to embodiments of the invention, the battery external surface may be cooled using the natural/forced air convection cooling methods, however, much of the heat generated from the battery cells within a battery pack accumulates in the central portion of the cells themselves and thereby leads to overheating of the cell(s), which, as a result, leads to capacity fading of the battery electrodes. Accordingly, batteries and battery packs exploiting PCM based internal BTM systems may benefit from both the internal passive cooling of the PCM based internal BTM systems discretely or in combination with external convection cooling. Accordingly, appropriate design of the battery pack with PCM based internal BTM system based cells and convection cooling can yield improved temperature distribution within the battery cell and pack thereby prolonging the cycle life of the battery.

Figure 5:
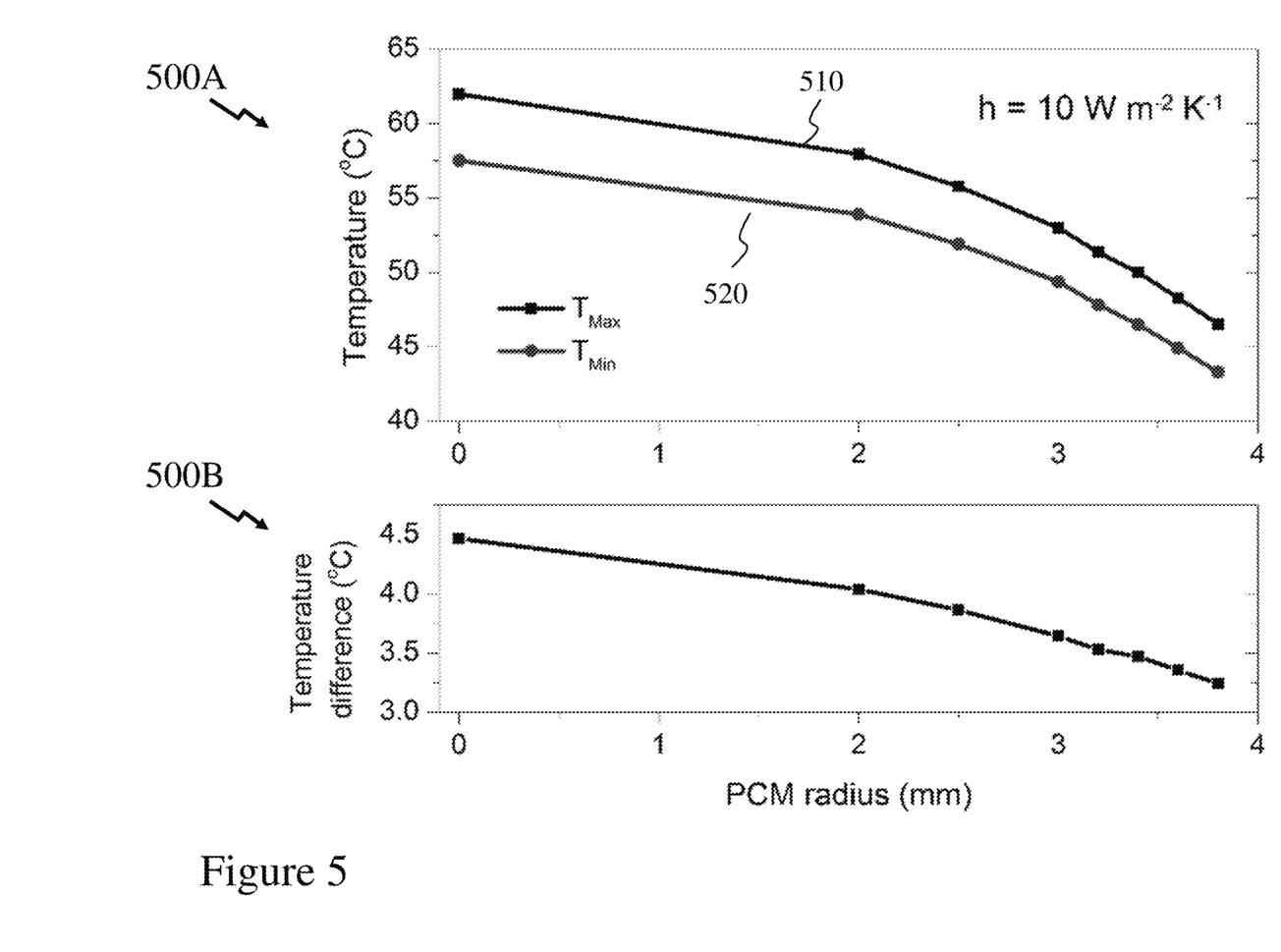
FIG. 5 depicts temperature and temperature uniformity curves for a 40-cell battery pack equipped with multiple cylindrical Li-ion battery cells exploiting PCM based internal BTM systems according to an embodiment of the invention for varying PCM core sizes.

B: Tests of the Phase Change Material Based Internal Battery Thermal Management System B1. Effect of PCM Filled Mandrel Size on Cooling Performance Referring to FIG. 4 there is depicted a schematic of a 40-cell battery pack with multiple cylindrical Li-ion battery cells exploiting PCM based internal BTM systems according to an embodiment of the invention. FIG. 5 depicts in first and second graphs 500A and 500B respectively temperature and temperature uniformity curves for the 40-cell battery pack depicted in FIG. 4 equipped with multiple cylindrical Li-ion battery cells exploiting PCM based internal BTM systems according to an embodiment of the invention for varying PCM core sizes. Referring to first graph 500A there are first and second lines 510 and 520 respectively which plot the minimum temperature and maximum temperature of the battery pack as a function of radius of the sealed mandrel 2 filled with the phase change material (PCM) 3. Second graph 500B depicts the maximum temperature differences of the battery as function of radius of the sealed mandrel 2 filled with the phase change material (PCM) 3. In each instance the temperatures are based upon simulations at end of high current discharge from the battery pack. In each simulation a natural convection boundary condition with a convective heat transfer coefficient of 10 W m$^{-2}$ K$^{-1}$ was applied on the battery pack surfaces.

The 0 mm core diameter representing the scenario where no PCM 3 is used in the battery. As the PCM diameter increases inside each battery cell of the battery pack, then the increasing quantity of PCM increases the absorption of the heat generated from the battery cells, thereby decreasing the temperature of the battery pack. At the same time, as the diameter of the PCM 3 within the sealed mandrel 4 then the temperature uniformity of the battery pack improves as the quantity of PCM used increases internally, which indicates the PCM based internal cooling design can improve the temperature uniformity/temperature distribution inside the battery cell and battery pack. Such improvements should result in improvement of the performance of the battery systems, e.g. batteries, cells, packs, and increase the lifespan of these battery systems.

B2. Comparison Study of PCM Based Internal BTM with External Cooling Using PCM

Figure 6:
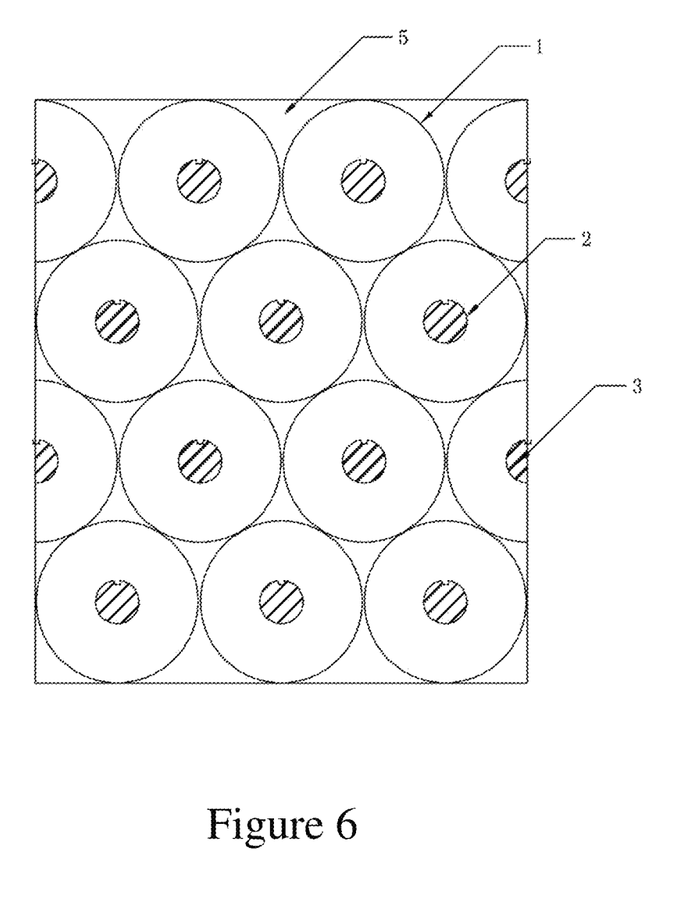
FIG. 6 depicts a schematic of a 4-layer battery pack with multiple cylindrical Li-ion battery cells exploiting PCM based internal BTM systems according to an embodiment of the invention.
Figure 7:
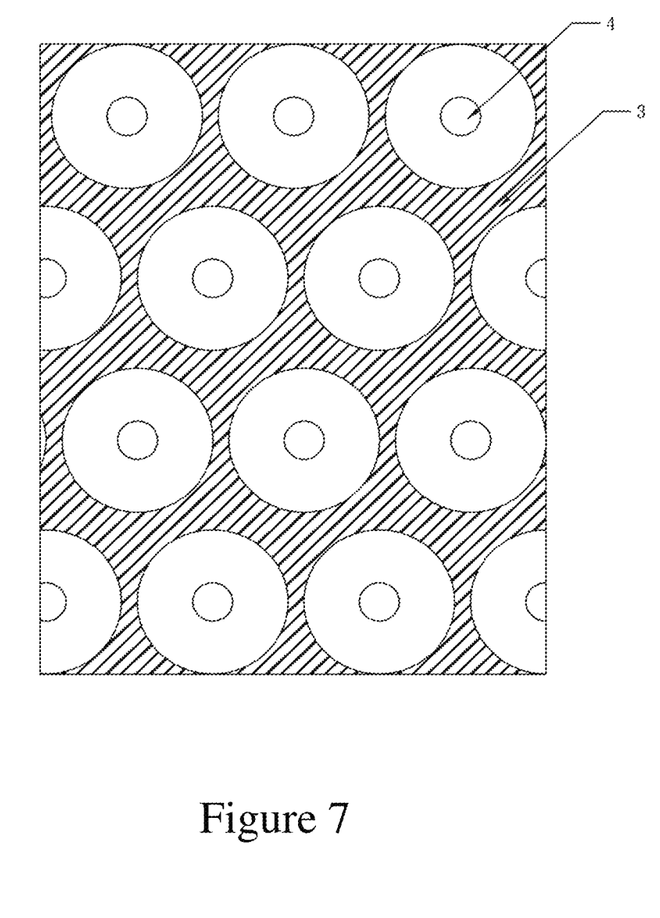
FIG. 7 depicts a schematic of a 4-layer battery pack with multiple cylindrical Li-ion battery cells exploiting a prior art external BTM system exploiting a PCM.

Referring to FIGS. 6 and 7 there are depicted schematics of 4-layer battery packs with multiple cylindrical Li-ion battery cells wherein:

FIG. 6 depicts the 4-layer battery pack exploiting PCM based internal BTM system according to an embodiment of the invention, where the mandrels have a radius of 4 mm; and FIG. 7 depicts the 4-layer battery pack exploiting a prior art external BTM system exploiting a PCM.

Figure 8:
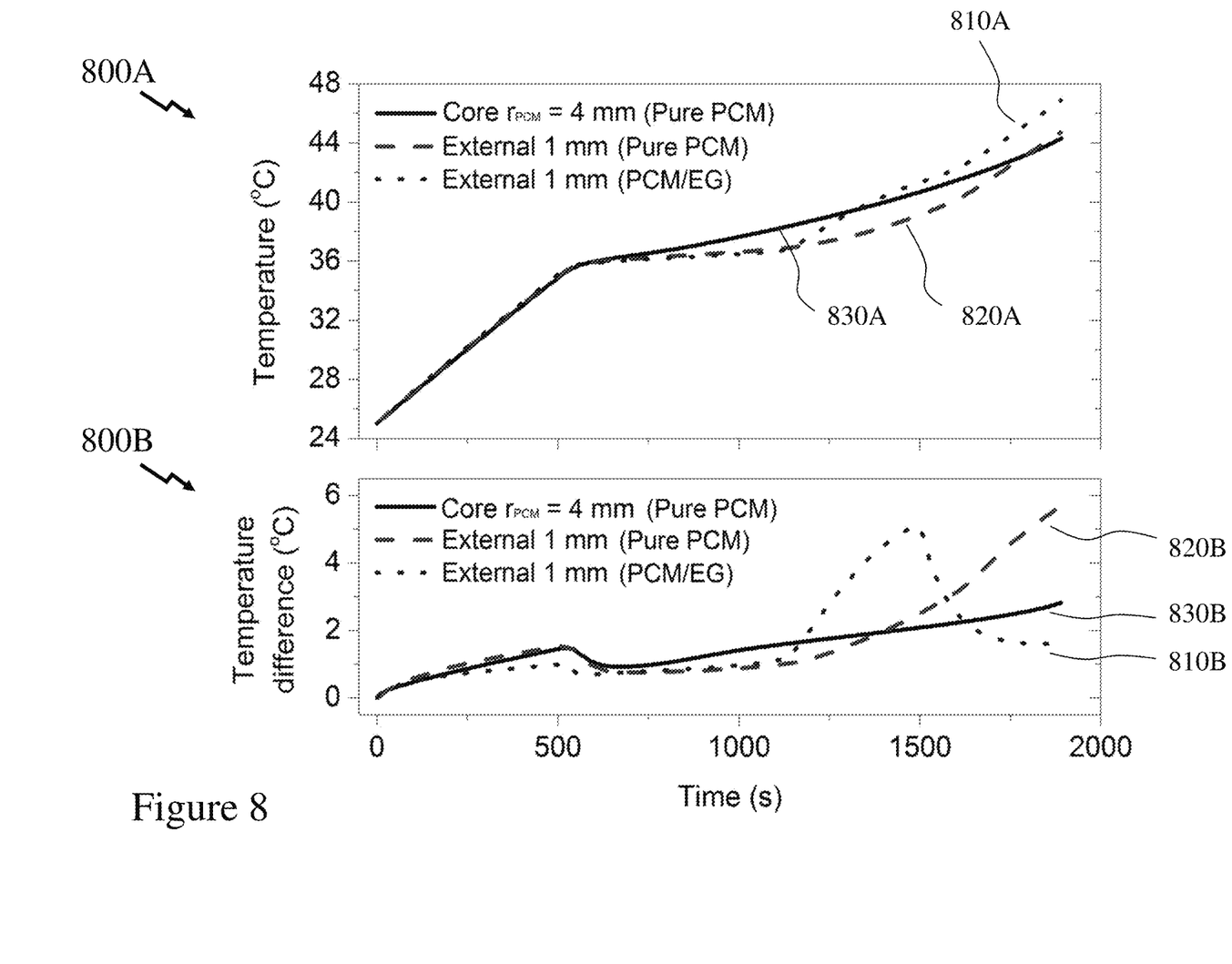
FIG. 8 depicts the temperature and temperature uniformity results of 4-layer battery pack according to the embodiments of the invention depicted in FIGS. 6 and 7 providing PCM based internal BTM system relative to a prior art PCM and EG-PCM external BTM systems on 4-layer battery pack.

Accordingly, simulations of the configurations depicted in FIGS. 6 and 7 were performed resulting in FIG. 8 depicts in first and second graphs 800A and 800B respectively temperature and temperature uniformity curves for the 4-layer packs depicted in FIGS. 6 and 7 respectively. The simulations were performed for high current drain over.

Accordingly, within first graph 800A there are depicted first to third curves 810A, 820A, and 830A respectively representing:

First curve 810A depicting the maximum temperature of the battery pack versus time for a prior art with an EG-PCM external cooling design, where 1 mm spaces in horizontal and vertical directions are left between batteries;

Second curve 820A depicting the maximum temperature of the battery pack versus time with a PCM external cooling design, where 1 mm spaces in horizontal and vertical directions are left between batteries; and Third curve 830A depicting the maximum temperature of the battery pack versus time for a 4 mm diameter sealed mandrel with PCM-based internal BTM according to an embodiment of the invention.

Within second graph 800B there are depicted fourth to sixth curves 810B, 820B, and 830B respectively representing:

Fourth curve 810B depicting the maximum temperature difference of the battery pack versus time for a prior art with an EG-PCM external cooling design, where 1 mm spaces in horizontal and vertical directions are left between batteries;

Second curve 820B depicting the maximum temperature of the battery pack versus time with a PCM external cooling design, where 1 mm spaces in horizontal and vertical directions are left between batteries; and Third curve 830B depicting the maximum temperature of the battery pack versus time for a 4 mm diameter sealed mandrel with only PCM-based internal BTM according to an embodiment of the invention.

It is evident from these that the PCM-based internal BTM system according to an embodiment of the invention can yield a lower temperature increase and improved temperature distribution in the battery pack than a battery pack exploiting a prior art external PCM system. Beneficially, the PCM-based internal BTM system has a significant lower physical volume. The results are summarized in Table 1 below. Accordingly, the PCM-based internal cooling systems according to embodiments of the invention can achieve a lower peak temperature and a lower temperature difference internal to the battery pack whilst also consuming less PCM and attaining a higher specific energy for the battery system.

TABLE 1

Testing Results of Prior Art PCM and EG-PCM Based External Cooled Battery Pack and Inventive Internal Cooled PCM Battery Pack

| Battery Thermal Management System | Consumed PCM (mm$^2$) | Normalized Specific Energy | Peak Temperature (° C.) | Peak Temperature Difference (° C.) |
|---|---|---|---|---|
| Inventive Internal PCM Cooling | 603.2 | 0.930 | 44.32 | 2.835 |

TABLE 1-continued

Testing Results of Prior Art PCM and EG-PCM Based External Cooled Battery Pack and Inventive Internal Cooled PCM Battery Pack

| Battery Thermal Management System | Consumed PCM (mm$^2$) | Normalized Specific Energy | Peak Temperature (° C.) | Peak Temperature Difference (° C.) |
|---|---|---|---|---|
| Pure PCM with External Cooling | 953.26 | 0.911 | 44.74 | 5.694 |
| EG-PCM with External Cooling | 953.26 | 0.917 | 46.89 | 5.095 |

Figure 9:
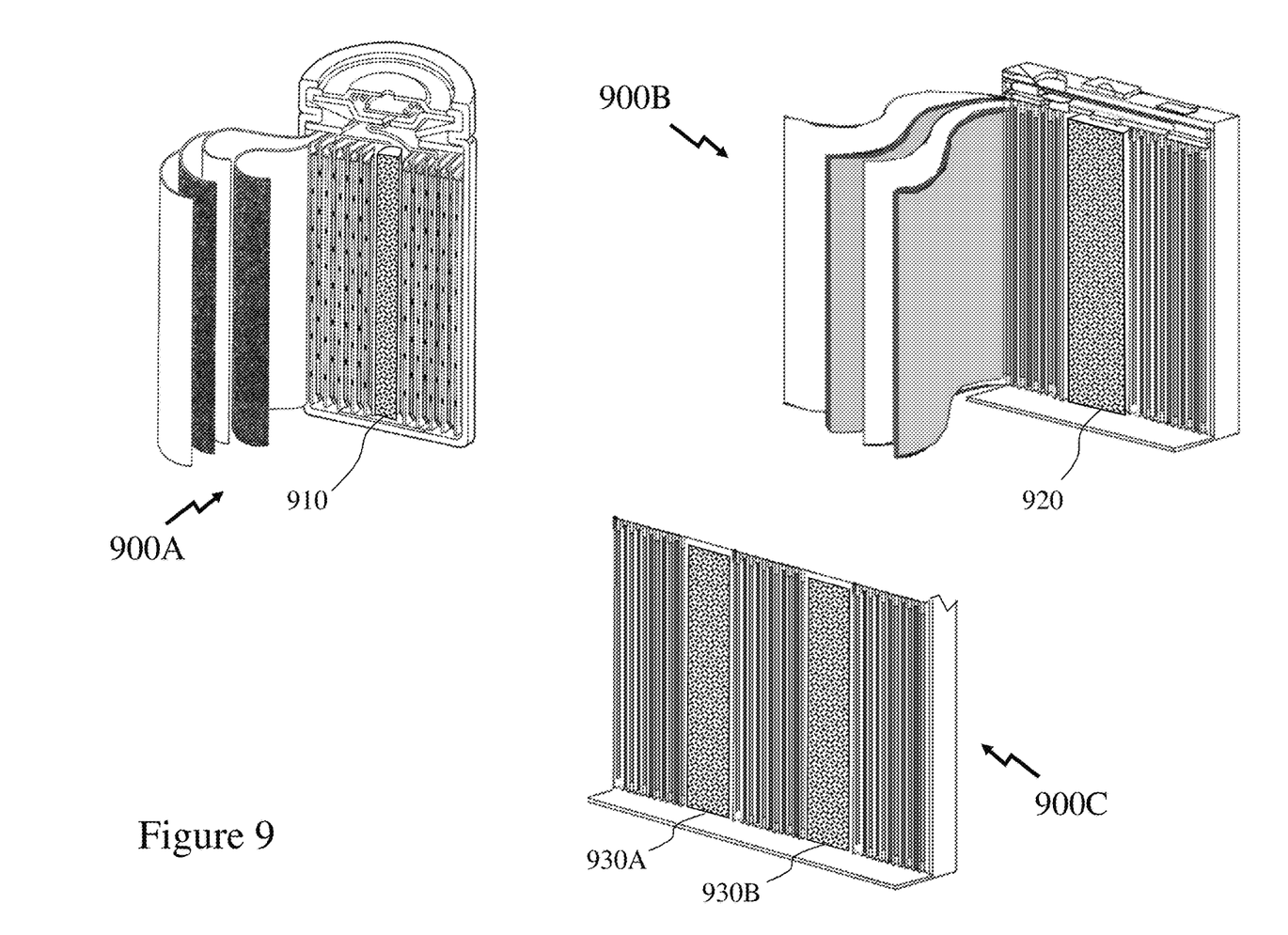
FIG. 9 depicts schematics of batteries and battery packs exploiting PCM based internal BTM systems according to an embodiment of the invention.

Referring to FIG. 9 there are depicted first to third battery cells 900A to 900C according to embodiments of the invention representing a cylindrical battery 900A with single PCM element 910 according to an embodiment of the invention, a first prismatic battery 900B with single PCM element 920 according to an embodiment of the invention, and a second prismatic battery 900C with dual PCM element 930A and 930B according to an embodiment of the invention. Within embodiments of the invention a battery or battery cell may employ a single element or multiple element according to the design of the battery and the construction of the anode, cathode, separator etc. The anode, cathode, separator etc. may be wound around the element or may not be wound around the element. Where multiple elements are employed then according to the battery geometry these may be in a one-dimensional array, two-dimensional array or three-dimensional array.

Within embodiments of the invention the sealed mandrel or element within which the phase change material or phase change materials are contained may be, as described supra, be formed from high thermal conductivity material, such as a metal, alloy, etc. Optionally, the body may be a single material, or it may be formed from multiple materials. Optionally, the body of the sealed mandrel or element may be formed from a non-thermally conductive or low thermal conductivity material in conjunction with a high thermal conductivity such as a base and/or top may be formed from a low thermal conductivity material whilst the body may be solely high thermal conductivity material, a combination of high thermal conductivity materials, or a combination of high thermal conductivity material and medium or low thermal conductivity material in a predetermined configuration.

Within embodiments of the invention the phase change material may be selected to transition from solid to liquid at a predetermined temperature in order than the endothermic process absorbs heat generated within the battery cell or battery pack. However, within other embodiments of the invention a phase change material may be selected such that the material transitions from solid to liquid at another predetermined temperature such that the exothermic liquid to solid process results in heating of the battery at low ambient temperatures such that the battery can operate at low temperatures, e.g. 5° C., and low current drain (where substantial heating of the battery does not warm the battery or battery pack). Within embodiments of the invention a single element may contain two or more phase change elements as a combined filling for the element or the single element may contain partitions within which different phase change materials are disposed. Optionally, multiple elements may be employed each filled with a different phase change material wherein these may, for example, be dispersed within the battery or battery pack discretely from elements containing other phase change materials or in combination within locations within the battery or battery pack.

Figure 10:
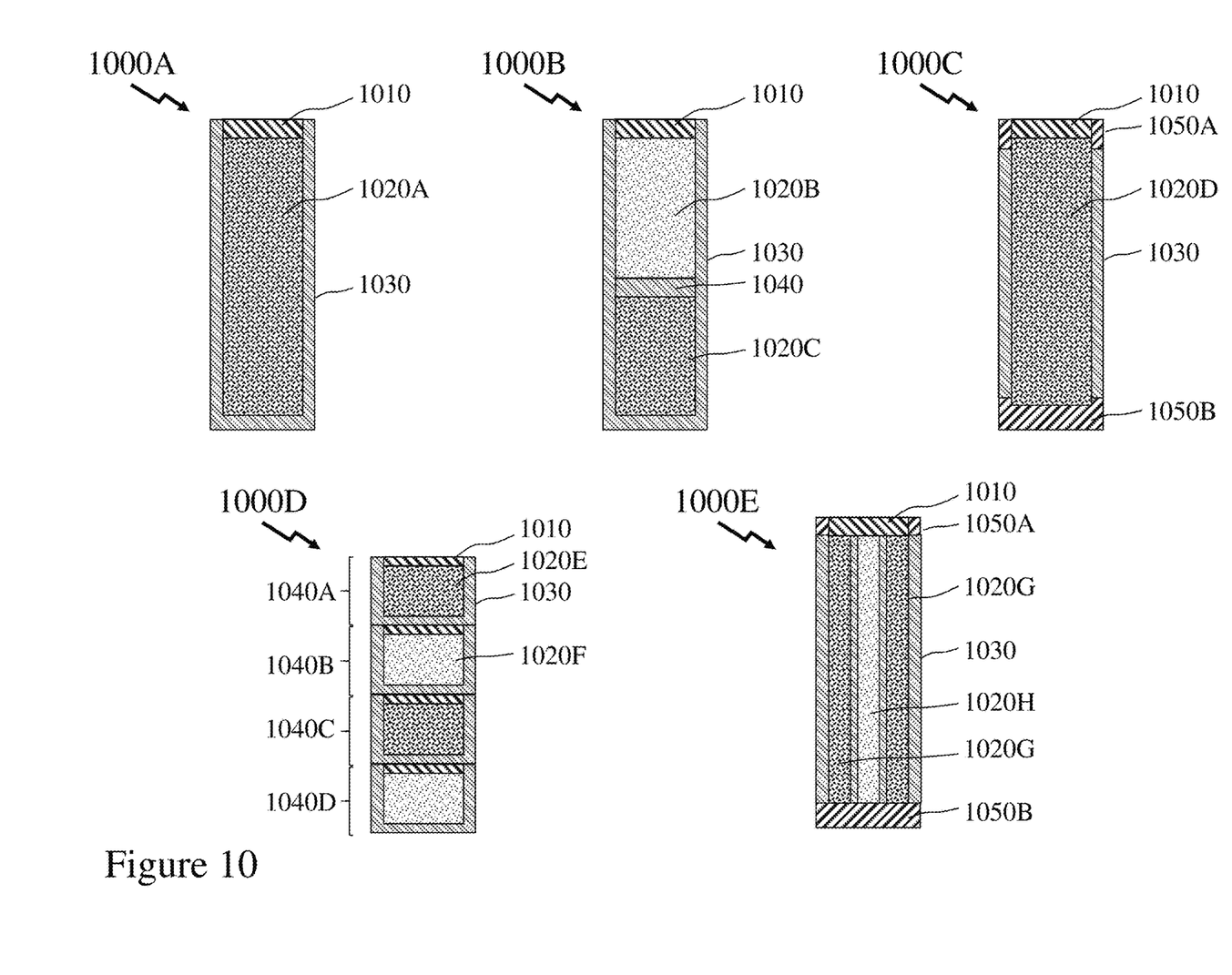
FIG. 10 depicts exemplary schematics of sealed mandrels and/or elements exploiting PCMs for PCM based internal BTM systems according to embodiments of the invention.

Accordingly, referring to FIG. 10 there are depicted exemplary first to fifth cross-sections 1000A to 1000E of sealed mandrels or elements exploiting one or more PCMs in combination with casings employing high thermal conductivity material(s) discretely or in combination with low thermal conductivity material(s) and/or medium thermal conductivity material(s). First image 1000A depicts a sealed element (mandrel) comprising an outer case 1030 formed from a material of predetermined thermal conductivity (e.g. high thermal conductivity) filled with a first PCM 1020A and sealed with end seal 1010. In second image 1000B the sealed element (mandrel) comprises other case 1030 formed from a material of predetermined thermal conductivity (e.g. high thermal conductivity) is filled with a second PCM 1020C, an interim seal 1040, and third PCM 1020B with end seal 1010.

Third image 1000C depicts a sealed element (mandrel) comprising an outer case comprising top and bottom sections 1050A and 1050B formed from a material of predetermined thermal conductivity (e.g. low or medium thermal conductivity) with a middle section 1030 formed from a material of predetermined thermal conductivity (e.g. high thermal conductivity). The outer case is filled with a fourth PCM 1020D and sealed with end seal 1010. Fourth image 1000D depicts a stack of sealed elements (mandrels) 1040A to 1040D each comprising an outer case 1030 and top seal 1010. First and third sealed elements 1040A and 1040C being filled with fifth PCM 1020E whilst second and fourth sealed elements 1040B and 1040D are filled with sixth PCM 1020F.

Fifth image 1000E depicts a sealed element (mandrel) comprising top and bottom sections 1050A and 1050B formed from a material of predetermined thermal conductivity (e.g. low or medium thermal conductivity) with a middle section 1030 formed from a material of predetermined thermal conductivity (e.g. high thermal conductivity). The sealed element (mandrel) comprising multiple chambers wherein an outer chamber or outer chambers are filed with seventh PCM 1020G and an inner chamber is filed with eighth PCM 1020H. It would be evident that in other embodiments of the invention the sealed elements (mandrels) may exploit combinations of these structures or other variants thereof.

Embodiments of the invention are described and depicted with respect to a cylindrical Li-ion rechargeable battery or power bank exploiting cylindrical Li-ion rechargeable batteries. However, embodiments of the invention may be exploited with other Li-ion rechargeable batteries both cylindrical and non-cylindrical including, but not limited to, 10180, 10280, 10440, 14250, 14430, 14500, 14650, 15270, 16340, 16650, RCR 123A, 17500, 17670, 18350, 18490, 18500, 18650, 20700, 21700, 25500, 26650, 32600, 32650, and 75400. It would also be evident that embodiments of the invention may be exploited with battery packs and/or power packs that combine multiple Li-ion rechargeable batteries into a single housing such as employed, for example, in the removable battery of a laptop computer, battery pack for portable power tools, within an EV etc.

Further, whilst embodiments of the invention are described and depicted with respect to Li-ion rechargeable batteries the methods and systems presented would be compatible with other secondary rechargeable battery technologies. For example, the embodiments of the invention are compatible with Li-ion battery technology, Li-ion polymer battery technology, Al-ion battery technology, Ni-MH battery technology, and Ni—Cd battery technology.

Embodiments of the invention have been described with respect to a mandrel or element which is filled with a phase change material. However, within other embodiments of the invention the mandrel or element may be filled with two or more phase change materials. Selection of the phase change material is typically established in dependence upon one or more factors including, but not limited to, maximum battery or battery pack current drain, power dissipation of battery or battery pack, maximum allowable external case temperature of battery or battery pack, and operating temperature range of battery or battery pack. Within embodiments of the invention a single phase change material may provide the required temperature management whilst in other embodiments of the invention may employ two or more phase change materials to achieve the desired temperature management. For example, a first level of temperature management may be achieved over a first temperature range through a first phase change material wherein the battery is operated under a first current drain range and a second level of temperature management may be achieved over a second temperature range through a second phase change material wherein the battery is operated under a second current drain range.

Embodiments of the invention have been described with respect to a mandrel or element which is filled with a phase change material. However, within other embodiments of the invention the mandrel or element may be filled with phase change materials composited with one or more other materials. Such materials may include thermally conductive materials and/or additives including, but not limited to, graphene, graphite, and carbon fibers for example.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A battery comprising:
a sealed element filled with one or more phase change materials, wherein
the sealed element is disposed in predetermined relationship to an anode structure, a cathode structure and an electrolyte which also form part of the battery;
the battery has at least one of a first configuration and a second configuration;
in the first configuration the battery further comprises:
a plurality of grooves formed within an outer surface of the sealed element, wherein
a first predetermined subset of the plurality of grooves are orientated in a first direction relative to an axis of either the sealed element or the battery; and
a second predetermined subset of the plurality of grooves are orientated in a second direction relative to the axis of either the sealed element or the battery; and
in the second configuration:
the sealed element is circular in cross-section;
the sealed element has a plurality of grooves within an outer surface of the sealed element; and
the anode structure and cathode structure comprise sheets of predetermined materials formed around the sealed element.

2. A battery comprising:
a sealed element filled with one or more phase change materials, wherein
the sealed element is disposed in predetermined relationship to an anode structure, a cathode structure and an electrolyte which also form part of the battery;
the battery has at least one of a first configuration, a second configuration and a third configuration;
in the first configuration the battery further comprises:
one or more grooves formed within an outer surface of the sealed element;
in the second configuration the battery further comprises:
one or more grooves formed within an outer surface of the sealed element wherein each groove of the one or more grooves spirals around the outer surface of the sealed element; and
in the third configuration the battery further comprises:
one or more grooves formed within the outer surface of the sealed element wherein each groove of the one or more grooves tapers from a first dimension at a first predetermined point on the sealed element to a second dimension at a second predetermined point on the sealed element.

3. A battery comprising:
a sealed element filled with a phase change material, wherein
the sealed element is disposed in predetermined relationship to an anode structure, a cathode structure and an electrolyte which also form part of the battery;
the battery has at least one of a first configuration and a second configuration:
in the first configuration:
the phase change material is one of a plurality of phase change materials and has a phase change temperature within a first predetermined range; and
another phase change material of the plurality of phase change materials has a phase change temperature within a second predetermined range different to the first predetermined range; and
in the second configuration:
the phase change material forms a predetermined portion of a composite material; and
another predetermined portion of the composite material is a thermally conductive material.

4. A battery comprising:
a sealed element filled a phase change material, wherein
the sealed element is disposed in predetermined relationship to an anode structure, a cathode structure and an electrolyte which also form part of the battery;

the battery has at least one of a first configuration, a second configuration and a third configuration;
the phase change material is one of a plurality of phase change materials;
in the first configuration:
   the phase change material transitions at a first predetermined temperature with an endothermic process thereby absorbing heat generated by the battery; and
   another phase change material of the plurality of phase change materials transitions at a second predetermined temperature with an exothermic process thereby generating heat to the battery;
in the second configuration:
   the sealed element comprises a plurality of portions; and
   each portion of the plurality of portions comprises a predetermined phase change material of the plurality of phase change materials; and
in the third configuration:
   the sealed element is one of a plurality of sealed elements disposed within the battery within a predetermined relationship; and
   each sealed element of the plurality of sealed elements comprises a predetermined phase change material of the plurality of phase change materials.

5. A battery comprising:
a sealed element filled with two or more phase change materials, wherein
the sealed element is disposed in predetermined relationship to an anode structure, a cathode structure and an electrolyte which also form part of the battery;
the sealed element comprises a plurality of portions;
   a first portion of the plurality of portions extending along an axis of the battery and comprising a first phase change material of the two or more phase change materials;
   a second portion of the plurality of portions extending along the axis of the battery and comprising a second phase change material of the two or more phase change materials; and
the first portion is inside the second portion.

* * * * *